Patented Aug. 8, 1950

2,518,379

UNITED STATES PATENT OFFICE 2,518,379

METAL-CONTAINING ORGANIC COMPOUND

Dilworth T. Rogers, Summit, and John G. McNab, Cranford, N. J., assignors to Standard Oil Development Company, a corporation of Delaware No Drawing. Original application December 30, 1944, Serial No. 570,742. Divided and this application June 25, 1949, Serial No. 101,498. In Canada September 3, 1943

11 Claims. (Cl. 260—608)

This invention relates to a new class of metal-containing organic compounds which may be characterized as basic metal salts of alkylated phenol sulfides.

This is a division of copending application Serial Number 570,742, filed December 30 1944, now patent No. 2,483,505, which in turn is a continuation-in-part of applications Serial Number 486,428, filed May 10, 1943, issued as Patent Number 2,406,564, granted August 27, 1946, and Serial Number 547,640, filed August 1, 1944, issued as Patent Number 2,409,687, granted October 22, 1946.

The new products of the present invention are useful as antioxidants, as extreme pressure agents, and in some cases as pour depressants when incorporated in mineral lubricating oils, and as antioxidants generally when incorporated in organic materials subject to deterioration in the presence of oxygen. In the aforementioned U. S. Patent Number 2,406,564 there was disclosed the preparation of compounds by the reaction of elemental sulfur with metal phenates and thiophenates and the usefulness of such compounds as detergents when incorporated in mineral lubricating oils. Similarly, in U. S. Patent Number 2,409,687 there was disclosed the reaction products obtained by reacting elemental sulfur with metal salts of hydroxy- and mercapto-substituted aromatic sulfides and their usefulness as additives for mineral lubricating oils. In both of these patents there was also disclosed the formation of products by reacting sulfur not only with normal metal salts of phenols, phenol sulfides, and the like, but also the reaction of sulfur with basic salts containing a greater proportion of metal in the compound than is present in a compound in which all of the valences of the metal are satisfied by the organic groups. The preparation of basic metal salts of alkylated phenol sulfides forms the subject matter of the present invention. It is believed that the basic salts have at least one hydroxy group attached to the metal atom which has replaced the hydrogen of a hydoxyl group. Therefore, only polyvalent metals can be present in such salts.

The new products of the present invention may be more accurately defined as the products obtained by reacting elemental sulfur with a basic polyvalent metal salt of a compound having the characterizing structure

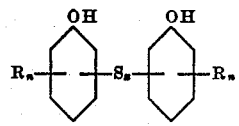

in which R is an alkyl group containing at least five carbon atoms, $n$ and $x$ are integers from 1 to 4. It is to be understood that when more than one R group is attached to a given aromatic nucleus, such groups may be alike or different. Illustrative examples of groups represented by R are the following: n-amyl, isoamyl, n-octyl, iso-octyl, tert.-octyl, dodecyl, octadecyl, wax chain radicals, and $C_{16}$–$C_{24}$ branched chain radicals. The metal may be any polyvalent metal, such, for example, as calcium, barium, strontium, aluminum, zinc, tin, cobalt, nickel or magnesium, but the divalent metals of group II of the periodic table are especially preferred for use in lubricating oil additives.

It should be understood that generally, throughout this specification and the appended claims, the term "alkyl phenol sulfide" or "alklated phenol sulfide" is meant to include not only the monosulfides but also the di- and polysulfides and polymers of alkyl phenol sulfides as well. The polymers of alkyl phenol sulfides may be represented structurally by the formula

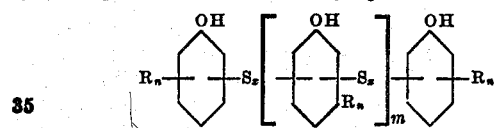

where R, $n$, and $x$ have the meanings given above and where $m$ is a small whole number not greater than about six. Although the reaction of an alkylated phenol with sulfur dichloride ($SCl_2$) will give essentially an alkyl phenol monosulfide, small amounts of polysulfides and of polymeric materials of the above type will also be formed. This is even more usually the result when more than the theoretically required proportion of sulfur halide is used in preparing the alkyl phenol sulfide, as for example, when two mols of alkyl phenol sulfide are treated with 1.5 mols of sulfur dichloride. Similarly, the alkyl phenols may be treated with more than theoretical quantities of sulfur monochloride (S₂Cl₂) or with mixtures of sulfur mono- and dichlorides or with first one halide and then the other.

In accordance with the present invention, it is possible to prepare basic metal salts having various ratios of metal to organic groups. Such a salt may have a ratio of metal to phenol sulfide of 1.5 to 1, 2 to 1 or even 3 to 1. In the case of a 2:1 ratio the formula may, for example, be

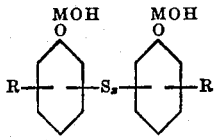

In the case of a 1.5:1 ratio the formula may be

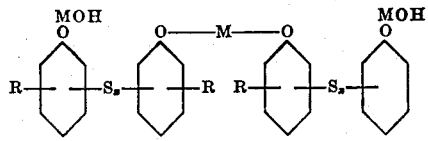

In the case of a 3:1 ratio the formula may be

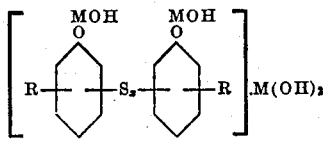

Intermediate ratios of metal to phenol sulfide, such as 1.8:1 or 2.3:1, may occur in which mixtures of the above types of basic compounds are obtained.

In addition to the basic salts prepared from divalent metals, basic metal salts formed from trivalent metals, such as aluminum, or tetravalent metals, such as tin, may be prepared.

For the objects stated, the metal salts of alkylated phenol sulfides have been preferably prepared from phenolic compounds readily obtained by synthetic alkylation of the simple phenols, followed by treatment with a sulfur chloride, and then neutralization with a metallic base.

Suitable synthetic alkyl phenols for preparing the desired phenol sulfide salts are preferably those containing secondary or tertiary alkyl radicals, because alkylation of a simple phenol occurs more readily with branched aliphatic reactants. Commonly, the alkylation reaction involves a condensation of olefins with the simple phenols, the reaction being catalyzed by anhydrous metal halides, boron fluoride, hydrofluoric acid, stannic chloride with hydrogen chloride, sulfuric acid, phosphoric acid or certain activated clays. As olefinic reactants, refinery gases containing propylene, butylenes, amylenes, etc., are economically useful, although individual olefins or olefin-containing mixtures derived from other sources may be used. Preferred individual olefins are the butenes, amylenes, and olefin polymers, such as diisobutylene or triisobutylene, or normal olefin polymers or copolymers of normal and secondary or tertiary olefins, or copolymers of olefins and diolefins. The reaction temperature is usually controlled to avoid side reactions. In employing sulfuric acid, a liquid phase reaction at relatively low temperature is preferred, while with phosphoric acid the reaction may be carried out in the vapor phase.

Suitable alkylated phenols for conversion to phenol sulfides may be thus prepared by alkylating phenol, cresol, or other phenolic compounds. High molecular weight alkylated phenols may also be used, for example, those prepared by condensing phenols with chlorinated petrolatum or chlorinated paraffin wax or with a chlorinated kerosene or gas oil. Naturally occurring phenols, such as those obtained by alkaline extraction of certain petroleum stocks or those obtained from cashew nut shell liquid or those obtained from other vegetable oil sources may likewise be used.

One class of alkyl phenols which are particularly preferred are those which have been prepared by alkylation of phenol with an olefin polymer such as diisobutylene or a refinery butene polymer oil. Alkylation of phenol with about an equal molar proportion of diisobutylene gives p-tert.-octyl phenol, also known as diisobutyl phenol or tetramethyl butyl phenol. This phenolic material is especially desirable because of the ease of its preparation and because products made from it are highly satisfactory for the present invention. In many instances, however, a higher degree of alkylation may be advantageous, and for this reason the phenol may be alkylated with as much as two molecular equivalents of diisobutylene to give, under proper conditions, essentially di-tert.-octyl phenol; or it may be alkylated with other olefin polymers such as triisobutylene, or other isobutylene polymers. For many purposes it is preferable to employ alkylated phenols having branched chain alkyl groups of from 16 to 30 carbon atoms. Suitable products may be prepared by alkylating phenol with certain of the polymeric materials obtained as byproducts in the manufacture of butyl alcohol from petroleum refinery butenes. These consist essentially of polymers of n-butene with small percentages of isobutene and other olefins and give alkylated phenols having branched chain alkyl groups of 16–20 or 20–24 carbon atoms, depending on the polymeric material used in the alkylation. It should be understood that in many cases the alkylation products may be mixtures of various compounds rather than entirely one specific alkyl phenol, and that it is intended to use such mixtures in practicing this invention.

For conversion of phenols to phenol sulfides the phenol is reacted with sulfur dichloride to produce essentially a phenol monosulfide having a thioether linkage, while sulfur monochloride may be used to produce essentially the phenol disulfide. About one-half to one mol of sulfur halide is used with each mol of phenol, and the reaction is preferably carried out in a solvent such as dichlorethane, chloroform, petroleum naphtha, benzol, xylol, toluol, and the like.

For converting the phenol sulfides to metal salts, it is usually sufficient merely to add a metal or a metallic oxide, hydroxide, sulfide, alkoxide, hydride, or carbide to a mineral oil solution or other solution of the phenol sulfide at an elevated temperature. Thus, barium salts of alkylated phenol sulfides are prepared by reacting the sulfide with barium hydroxide, preferably in the form of the hydrate, Ba(OH)₂.8H₂O. The calcium salts may be prepared by reacting alkyl phenol sulfides with calcium methylate or other calcium alcoholate. In some instances it may be preferable to prepare heavy metal salts from the alkali metal salt by double decomposition. In many cases the metal alkyl phenol sulfide prepared by neutralization with a metal hydroxide may occur as a hydrated salt. Use of hydrated salts prepared in this manner or by any other method is also contemplated in the processes of the present invention.

One method for converting the alkyl phenol sulfides to basic metal salts consists merely in adding a metallic oxide or hydroxide to a solution of the phenolic compound in a quantity greater than that required to form the normal salt, the reaction generally being conducted at an elevated temperature.

It may be found that in some cases not all of the metallic base which has been added for the purpose of forming a pure basic metal salt will react with the organic compound. However, substantial quantities of the metal base, above that required to form a normal salt, will usually react, and the product may therefore consist of a mixture of the normal salt and the basic salt. It is to be understood that the invention includes the use of such mixtures as well as pure basic salts in the subsequent reaction with sulfur.

Specific examples of compounds which may be treated with sulfur in accordance with the present invention include, among others, the following: basic barium salt of tert.-octyl phenol sulfide, basic calcium salt of cetyl phenol sulfide, basic barium salt of wax-alkylated phenol sulfide, basic cobalt salt of tert.-amyl phenol sulfide, basic salt of mixed calcium-barium tert.-octyl phenol sulfide, basic stannic salt of $C_{16}$–$C_{20}$ branched chain alkyl phenol sulfide, basic barium salt of 2,4-diamylphenol sulfide, basic magnesium salt of octadecyl phenol sulfide, basic aluminum salt of tert.-octyl phenol sulfide, and basic barium salt of $C_{16}$–$C_{24}$ branched chain alkyl phenol sulfides.

In accordance with the present invention, the basic metallic salt of the alkyl phenol sulfide is caused to react with sulfur. This may be accomplished by adding the sulfur in elemental form to a heated solution of the salt. Sulfur may be used in any of its allotropic forms.

In carrying out the reaction described above the proportions of sulfur and metal salt are so chosen that from 0.1 to 2.5 atomic proportions of sulfur are reacted with one atomic proportion of metal, the preferred ratio being within the limits of about 0.5 to 1.5 atomic proportions of sulfur for each atomic proportion of metal. This preferred ratio gives the products the optimum content of sulfur to impart to them the maximum amount of inhibiting power when employed as antioxidants.

If desired, certain of the products used in accordance with this invention may be prepared by the simultaneous reaction of an alkylated phenol sulfide, a metallic oxide or hydroxide, and elemental sulfur. However, it is generally preferred to first form the basic metal salt and then react this with sulfur.

Although the reaction can be brought about by heating the metal salt directly with sulfur, it is more convenient to carry out the reaction with the aid of solvents, particularly high boiling hydrocarbon solvents, such as xylol or a petroleum fraction. A particularly preferred reaction medium is a lubricating oil fraction, since the final reaction product may thus be obtained as a mineral oil concentrate of the desired additive, which may be conveniently shipped or stored as such and then readily blended with a lubricating oil base stock in the desired concentration to form a finished lubricating oil blend. The reaction may be carried out at 90° to 210° C., preferably at 170° to 190° C. Further conditions for conducting the reaction are discussed in detail in the specifications of the aforementioned copending applications.

The additives may generally be prepared by first dissolving an alkylated phenol sulfide in a mineral oil or other suitable solvent and treating the same with a metal hydroxide, e. g., $Ba(OH)_2.8H_2O$, at about 80°–200° C., preferably 110°–150° C. After a further period of heating free sulfur is added, heating being continued at 100°–230° C., preferably at 150°–200° C., to complete the reaction. The period of heating will generally be from about 10 minutes to one hour, although in some cases a longer period may be required. When the material will no longer stain a strip of copper immersed in it for about 10 seconds at 180°–190° C., the reaction is considered complete. The product is then filtered, giving a concentrate of the desired additive. If the products are found to have a slight odor of hydrogen sulfide, this can be substantially eliminated by treating with a small proportion (2–5%) of barium hydroxide or calcium oxide or hydroxide at 150° C., followed by filtering and blowing with nitrogen at 100°–120° C. In some cases improved products may be obtained by heat treatment of the metal phenol sulfide before or after reaction with sulfur. The heat treatment may be conducted, for example, at 150° C. for 10–15 hours.

It has been found that good results are obtained when preparing these additives in mineral oil if a minor proportion of a higher alcohol, such as stearyl, lauryl or cetyl alcohol, or wool fat alcohol or the like, is added to the reaction mixture in which the compounds of the present invention are prepared. This alcohol reduces foaming during the process and acts as an auxiliary solvent for the final product. The best results are obtained by adding a sufficient quantity of alcohol to give a concentration of about 3% to about 15% in the final additive concentrate. It has been determined by test that substantially none of the higher alcohol enters into the reaction.

It has also been found that products of better oil solubility can often be obtained when carrying out the reaction with sulfur in the presence of a small proportion of an olefinic material, such as a tetraisobutylene, cracked wax or an unsaturated alcohol.

In the following example is described the preparation of a product in accordance with this invention. It is to be understood that this example, given for illustrative purposes only, is not to be construed as limiting the scope of the invention in any way.

*Preparation of basic barium tert.-octyl phenol sulfide*

A mixture of 7,740 grams of tert.-octyl phenol sulfide, 13,500 grams of SAE 20 grade mineral lubricating oil and 1,500 grams of stearyl alcohol was placed in an 8 gallon reactor and heated to 120°–125° C. with stirring and blowing with nitrogen. Over a period of 16 hours of heating and stirring 9,000 grams of barium hydroxide, $Ba(OH)_2.8H_2O$, was gradually added. Heating was continued for 8 hours and the temperature was then raised to 140°–145° C. and the product was filtered, giving a mineral oil concentrate containing approximately 40% basic barium tert.-octyl phenol sulfide, 6% stearyl alcohol and 54% mineral lubricating oil. Analysis of the concentrate: 12.95% barium, 3.13% sulfur.

500 parts of the concentrate prepared as described above was heated at 150° C. with 5 parts of elemental sulfur (this being equivalent to 2.5% of sulfur based on the amount of metal salt in the concentrate) for 5½ hours, at the end of which time all of the sulfur had reacted. The product was found to contain 4.24% sulfur.

What is claimed is:

1. As a new composition of matter a product obtained by reacting elemental sulfur with a basic polyvalent metal salt of an alkylated phenol sulfide having at least 5 carbon atoms in each alkyl group at a temperature of 90° to 210° C., the proportion of reactants being such that 0.1 to 2.5 atomic proportions of sulfur are present for each atomic proportion of metal.

2. A composition according to claim 1 in which the metal of the metal salt is a divalent Group II metal.

3. A composition according to claim 1 in which the metal of the metal salt is barium.

4. A composition according to claim 1 in which the alkylated phenol sulfide is tert.-octyl phenol sulfide.

5. A composition according to claim 1 in which the metal of the metal salt is barium and in which the alkylated phenol sulfide is tert.-octyl phenol sulfide.

6. The process which comprises reacting elemental sulfur with a basic polyvalent metal salt of an alkylated phenol sulfide having at least 5 carbon atoms in each alkyl group at a temperature of 90° to 210° C., the proportions of reactants being such that 0.1 to 2.5 atomic proportions of sulfur are present for each atomic proportion of metal.

7. A process according to claim 6 in which the metal of the metal salt is a divalent Group II metal.

8. A process according to claim 6 in which the metal of the metal salt is barium.

9. A process according to claim 6 in which the alkylated phenol sulfide is tert.-octyl phenol sulfide.

10. A process according to claim 6 in which the metal of the metal salt is barium and in which the alkylated phenol sulfide is tert.-octyl phenol sulfide.

11. A process according to claim 10 in which the reaction is conducted in the presence of a mineral lubricating oil.

DILWORTH T. ROGERS.
JOHN G. McNAB.

REFERENCES CITED

The following references are of record in the file of this patent:

UNITED STATES PATENTS

| Number | Name | Date |
| --- | --- | --- |
| 2,406,564 | Rogers et al. | Aug. 27, 1946 |
| 2,409,687 | Rogers et al. | Oct. 22, 1946 |
| 2,483,505 | Rogers et al. | Oct. 4, 1949 |